Figure 1:
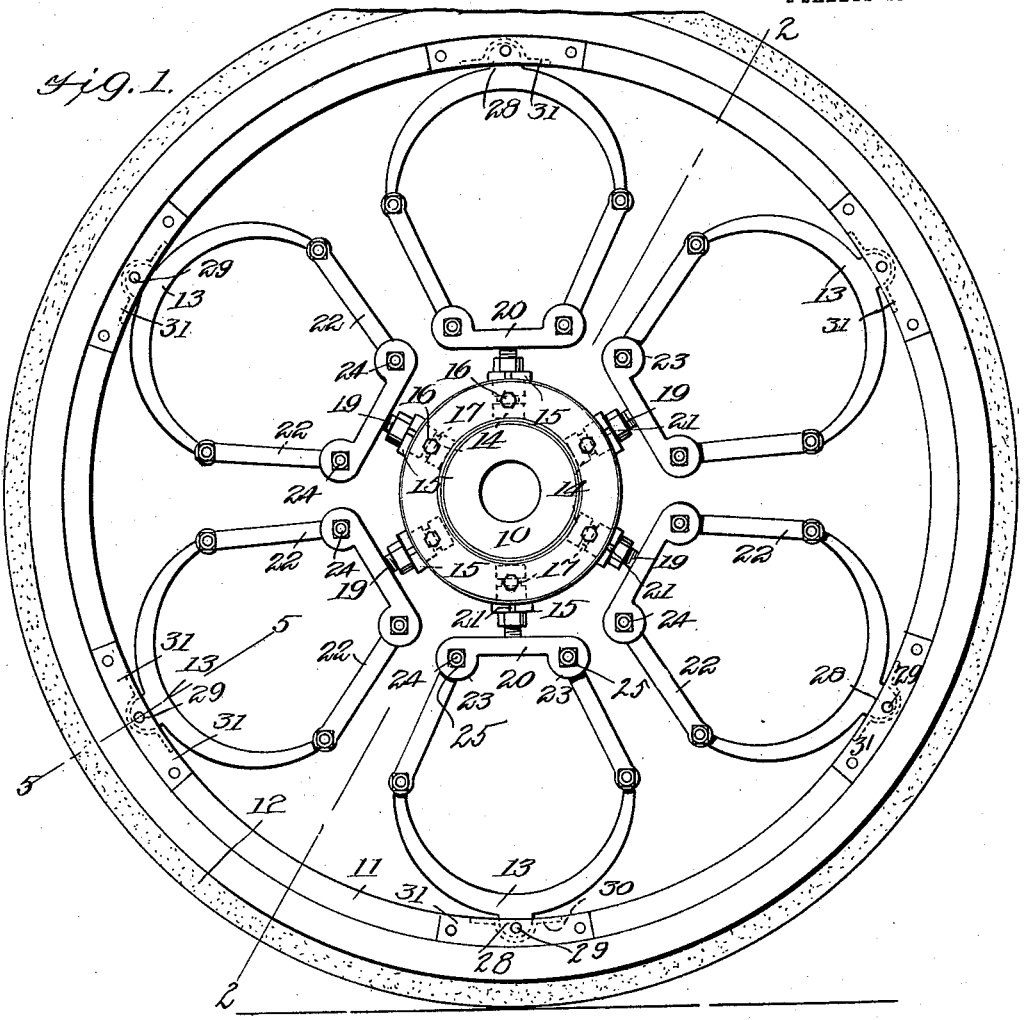

G. V. STEIN.
SPRING WHEEL.
APPLICATION FILED MAR. 9, 1911.

1,014,533.

Patented Jan. 9, 1912.
2 SHEETS—SHEET 1.

WITNESSES
F. C. Barry
A. R. Walton

INVENTOR
Georg V. Stein
By Max A. Schmidt
Attorney

G. V. STEIN.
SPRING WHEEL.
APPLICATION FILED MAR. 9, 1911.
1,014,533.
Patented Jan. 9, 1912.
2 SHEETS—SHEET 2.
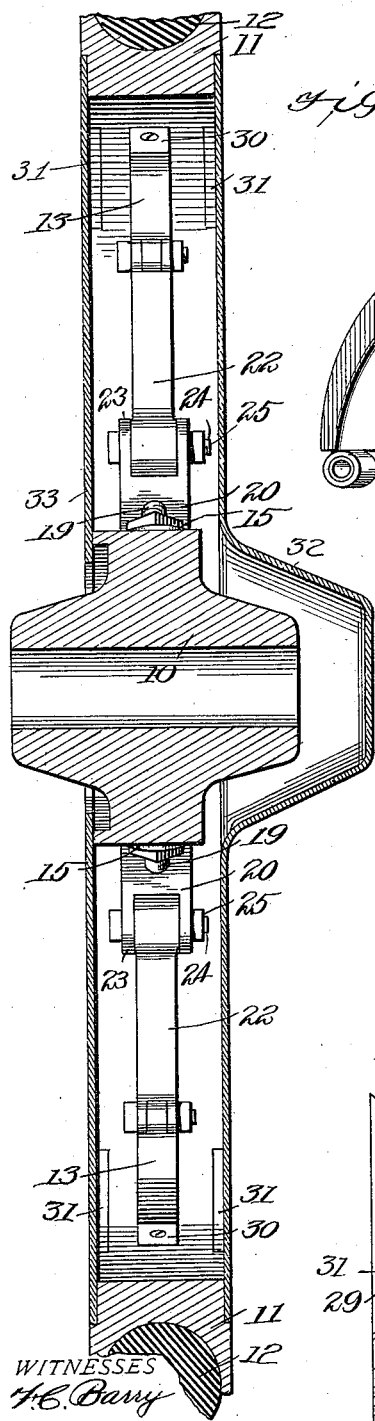
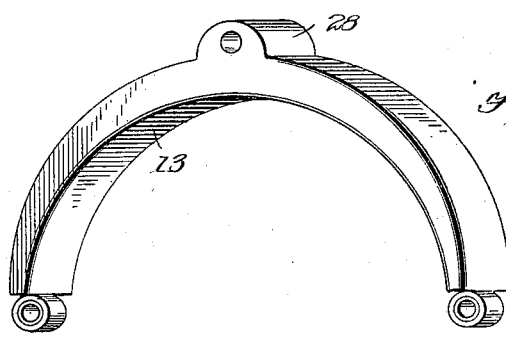
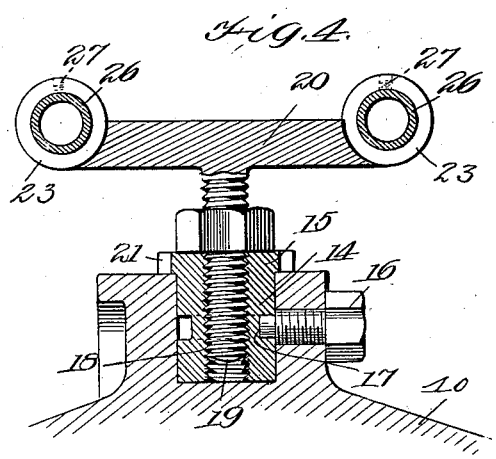
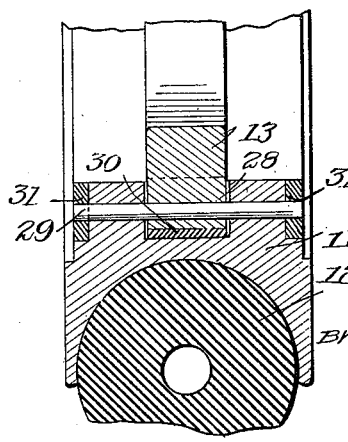
WITNESSES
H. E. Barry
A. R. Walton
INVENTOR
Georg V. Stein
BY Max A. Schmidt
Attorney

UNITED STATES PATENT OFFICE.

GEORG V. STEIN, OF WASHINGTON, INDIANA, ASSIGNOR, BY DIRECT AND MESNE ASSIGNMENTS, OF ONE-THIRD TO AUSTIN F. CABEL, OF WASHINGTON, INDIANA, AND ONE-THIRD TO HARRY WEILL, OF INDIANAPOLIS, INDIANA.

SPRING-WHEEL.

1,014,533.      Specification of Letters Patent.      Patented Jan. 9, 1912.

Application filed March 9, 1911. Serial No. 613,220.

*To all whom it may concern:*

Be it known that I, GEORG V. STEIN, a citizen of the United States, residing at Washington, in the county of Daviess and State of Indiana, have invented certain new and useful Improvements in Spring-Wheels, of which the following is a specification.

This invention relates to that class of vehicle wheels wherein the rim is connected to the hub by springs which normally maintain the rim and hub in concentric relation, and yield to take up shocks imparted to the wheel upon passing over rough roads or obstructions.

It is the object of the present invention to provide a wheel of the kind stated which is strong and durable, and simple in construction, and also to provide a novel arrangement of springs and means for connecting the same to the hub and rim of the wheel so that an equal pressure will be exerted on all parts of the hub and rim, and thus dispense with a pneumatic tire.

In order that the invention may be better understood, reference is had to the accompanying drawings forming a part of this specification, in which drawings—

Figure 1 is an elevation of the wheel showing the housing inclosing the same removed. Fig. 2 is a transverse section taken on the line 2—2 of Fig. 1. Fig. 3 is a perspective view of one of the springs removed. Fig. 4 is an enlarged sectional detail of the adjustable connection for the ends of the springs. Fig. 5 is an enlarged section on the line 5—5 of Fig. 1.

Referring specifically to the drawings, 10 denotes the hub of the wheel; and 11, the rim, the latter being grooved to receive a solid tire 12 of rubber, leather, or some suitable fiber or composition. The rim is a continuous rigid band of steel or other suitable metal, and is connected to the hub by a series of arcuate springs 13 which are so tempered that their ends have a tendency to approach each other.

The following means are provided for connecting the springs 13 to the hub and rim of the wheel. In the periphery of the hub, at regular intervals, are sockets in which seat cylindrical plugs 14 having at their outer ends an annular shoulder 15 which fits the periphery of the hub. The plugs are rotatable in the sockets, but they are held against movement in the direction of their length by means of set screws 16 threaded through one side of the hub and having their points or inner ends extending into annular grooves 17 in the surface of the plugs. Each plug has a central longitudinal bore 18 which is screw-threaded to receive a screw stem 19 which is of a length to project a suitable distance from the plug, and carries at its outer end a cross-bar 20. The plug operates as a non-traveling nut and when rotated moves the stem 19 in the direction of its length. To facilitate the turning of the plug, its shoulder 15 has notches 21 in its edge to afford a hold for a spanner wrench. To the ends of the cross-bars 20 are pivoted, at one of their ends, links 22 to the other ends of which the respective ends of the springs 13 are pivotally connected. The ends of the cross-bars are formed with knuckles 23 between which the links are received, and the pivotal connection is made by bolts 24 passing through said parts and secured by nuts 25. The bolt openings in the parts are lined with removable steel bushings 26 which are held in place by set screws 27. When the bushings become worn they can be readily removed and renewed. A similar pivotal connection between the links and the springs is provided.

The springs 13 are formed intermediate their ends with lugs 28 having a transverse opening to receive a pin 29 whereby the connection between the rim 11 and the springs is made. The inner periphery of the rim is formed at regular intervals with recesses in which are mounted saddles 30 having a depression to receive the lugs 28, said lugs and the depression being substantially semi-circular so that the former are free to rock in the latter. To opposite sides of the rim are secured retaining plates 31 having perforations which receive the ends of the pin 29 passing through the transverse openings in the lugs 28, whereby the springs are connected to the rim. The wheel is also provided with front and inside covers 32 and 33, respectively, which are secured to the rim 11.

The connection of the links 22 to the ends of the springs 13 produces a toggle action and an even pressure is exerted by the springs on all portions of the hub 10 and the rim 11, so that said parts are held normally in concentric relation. When the wheels pass over a rough place or an obstruction, the radius from the axle to that portion of the rim which is in contact with the ground is reduced, and the radius from a diametrically opposite point on the rim to the axle is correspondingly increased. In other words, the axle becomes eccentric to the rim. This also happens when an extra load is placed on the wheel. This relative movement of the hub and rim is cushioned by the springs, and as the latter exerts an even measure on all portions of the hub and rim, the parts are restored to their normal concentric position as soon as the obstruction is passed. The tension of the springs may be varied to suit the load carried by operating the plug 14 to advance or retract the screw stem 19. The advantage of the solid tire 12 is that it is not flattened where it is in contact with the ground, as is the case with pneumatic tires, such flattening seriously affecting the running qualities of the wheel.

I claim:

1. A wheel comprising a hub, a rim, arcuate springs connected intermediate their ends to the rim, spreader bars carried by the hub and adjustable toward and from the rim, and links connecting the ends of each spring to one of the spreader bars.

2. A wheel comprising a hub, a rim, arcuate springs connected intermediate their ends to the rim, non-traveling nuts carried by the hub, screw stems threaded into the nuts, spreader bars carried by the screw stems, and links connecting the ends of each spring to one of the spreader bars.

In testimony whereof I affix my signature in presence of two witnesses.

GEORG V. STEIN.

Witnesses:
J. A. COLBERT,
C. B. COLBERT.

---

Copies of this patent may be obtained for five cents each, by addressing the "Commissioner of Patents, Washington, D. C."